United States Patent Office 3,316,229
Patented Apr. 25, 1967

3,316,229
CRYSTALLINE POLYMETHYL METHACRYLATE
Edwin J. Vandenberg, Foulk Woods, Del., assignor to Hercules Incorporated, Wilmington, Del., a corporation of Delaware
No Drawing. Filed Aug. 12, 1966, Ser. No. 571,985
12 Claims. (Cl. 260—89.5)

This application is a continuation of my application Ser. No. 602,903, filed Aug. 8, 1956 and now abandoned, which is in turn a continuation-in-part of my application Ser. No. 579,766, filed Apr. 23, 1956 and now abandoned.

This invention relates to a new polymethyl methacrylate and to its method of preparation and, more particularly, to a crystalline polymethyl methacrylate.

It is well known that methyl methacrylate may be polymerized in bulk, solution, suspension, or emulsion polymerization systems with free radical type catalysts, as for example, peroxides, persulfates, azo initiators, etc. However, it has not previously been possible to produce by any of these means a crystalline polymer.

Now, in accordance with this invention, it has been discovered that a crystalline polymethyl methacrylate may be produced by contacting methyl methacrylate with a catalyst formed by mixing a compound of a metal of Groups IV–B, V–B, VI–B, VII–B or VIII of the Periodic Table with an organometallic compound of a metal of Groups I, II or III of the Periodic Table. The polymethyl methacrylate so obtained is a crystalline polymer exhibiting a crystalline-type X-ray diffraction powder pattern.

The polymerization of methyl methacrylate in accordance with this invention may be carried out in a variety of ways. The process may be a batch or continuous operation and may be carried out with or without the use of an inert organic diluent as the reaction medium. Any inert liquid organic diluent may be used, as for example, aliphatic hydrocarbons such as hexane, heptane, etc., cycloaliphatic hydrocarbons such as cyclohexane, aromatic hydrocarbons such as benzene, toluene, xylene, etc., or any mixture of such hydrocarbons, halogenated hydrocarbons such as ethyl chloride, methyl chloride, methylene chloride, ethylene chloride, chlorobenzene, and aliphatic ethers, cycloaliphatic ethers, aromatic ethers, and cyclic ethers, as for example, diethyl ether, dioxane, tetrahydrofuran, etc.

The selection of the temperature and pressure used for the polymerization process will obviously depend upon the activity of the catalyst system being used, the diluent used, the degree of polymerization desired, etc. In general, the polymerization will be carried out at room temperature or slightly above, but any temperature within the range of from about $-50°$ C. to about $150°$ C., and preferably from about $-20°$ C. to about $100°$ C., may be used. In the same way, while atmospheric pressure or a pressure of only a few pounds may be used, the polymerization may be carried out under a wide range of pressures, as for example, from a partial vacuum to about 1000 pounds and preferably from about atmospheric to about 500 pounds pressure. Higher pressures may, of course, be used but generally do not appreciably alter the course of the polymerization.

In the polymerization of methyl methacrylate in accordance with this invention using as the catalyst for the polymerization a combination of a compound of a metal of Groups IV–B, V–B, VI–B, VII–B and VIII of the Periodic Table with an organometallic compound, any inorganic or organic salt or complex of the metals of Groups IV–B, V–B, VI–B, VII–B or VIII may be used. Thus, any compound of titanium, zirconium, hafnium, thorium, vanadium, tantalum, chromium, molybdenum, tungsten, uranium, manganese, rhenium, iron, cobalt, or nickel, etc., may be used. Exemplary of such compounds are titanium tetrachloride, zirconium tetrachloride, titanium trichloride, vanadium dichloride, vanadium trichloride, vanadium trifluoride, vanadium oxychloride, vanadium oxydichloride, tantalum pentachloride, molybdenum trichloride, molybdenum pentachloride, chromium dichloride, chromium trichloride, ferric chloride, manganese dichloride, vanadium trioxide, vanadium pentoxide, chromium oxide, vanadium oxyacetylacetonate, chromium acetylacetonate, cobalt acetylacetonate, iron acetylacetonate, manganese acetylacetonate, alkyl vanadates, alkyl titanates, etc., or the reaction product produced by mixing a compound such as titanium tetrachloride, vanadium tetrachloride, etc., with an organometallic compound of an alkali metal, alkaline earth metal, zinc, or aluminum. When a compound such as titanium tetrachloride, vanadium tetrachloride, vanadium oxytrichloride, etc., is mixed with the above-mentioned organometallic compounds, a reaction takes place which is believed to be a reduction of the transition metal compound from the higher valence of the transition metal to one or more of its lower valence states.

In carrying out the reaction of the transition metal compound such as vanadium tetrachloride, titanium tetrachloride, etc., with an organometallic compound prior to its use in the polymerization system, as already pointed out, any organometallic compound of a metal of Groups I, II or III, i.e., an alkali metal, alkaline earth metal, zinc or aluminum, may be used. Exemplary of such organometallic compounds are the alkali metal alkyls or aryls such as butyllithium, amylsodium, phenylsodium, etc., dimethyl magnesium, diethyl magnesium, diethyl zinc, butyl magnesium chloride, phenyl magnesium bromide, triethylaluminum, tributylaluminum, triisobutylaluminum, trioctylaluminum, tridodecylaluminum, dimethylaluminum chloride, diethylaluminum bromide, diethylaluminum chloride, ethylaluminum dichloride, the equimolar mixture of the latter two known as aluminum sesquichloride, dipropylaluminum fluoride, diisobutylaluminum fluoride, diisobutylaluminum chloride, diethylaluminum hydride, ethylaluminum hydride, diisobutylaluminum hydride, etc., and complexes of such organometallic compounds, as for example, sodium aluminum tetraethyl, lithium aluminum tetraoctyl, sodium aluminum triethyl chloride, etc. If the organometallic compound that is used is insoluble in the reaction mixture, it may be desirable to reduce the particle size of it prior to use by ball-milling or other means. The molar ratio of the organometallic compound to the transition metal compound in carrying out the reaction may be varied over a wide range, but usually there should be used an amount of the organometallic compound that will produce the desired amount of reduction. Thus, larger ratios of organometallic compound to the transition metal compound are required for alkali metal alkyls than for trialkylaluminum compounds, etc. In general, the reaction is carried out by mixing the transition metal compound and the organometallic compound in an inert organic diluent. The insoluble precipitate which is formed may be separated from the inert diluent and then added to the polymerization system in combination with the organoaluminum compound. This separation of the insoluble reaction product from the diluent may be carried out by means of centrifugation, filtration, etc. In some cases it may be desirable to wash the insoluble reaction product with additional amounts of the diluent in order to completely remove all of the soluble by-products. On the other hand, the suspension of the reaction product produced may be used directly in the polymerization system without going through the separation step. The reaction product may be used immediately or it may be aged by allowing the reaction mixture to stand at room temperature for anywhere from a few minutes to several hours or longer, or it may be subjected to a heat treatment, i.e., heating the reaction mixture at elevated temperatures.

In carrying out the polymerization of the methyl methacrylate with the combination of a compound of a metal of Groups IV–B, V–B, VI–B, VII–B or VIII of the Periodic Table with the organometallic compound, it is usually preferable to utilize the transition metal compound in a finely divided form. Such a finely divided form is obtained when the transition metal compound is reduced with the organometallic compound period to the polymerization as described above. Another means of obtaining a finely divided form of the transition metal compound is to subject the latter, for example, vanadium trichloride, vanadium oxydichloride, molybdenum trichloride, or chromium trichloride, to a ball-milling operation carried out in an inert diluent. By such means it is possible to produce almost any desired particle size.

As pointed out above, any organometallic compound of a metal of Groups I, II or III of the Periodic Table, i.e., an alkali metal, alkaline earth metal, zinc, or aluminum, may be used in combination with the transition metal compound to catalyze the polymerization of methyl methacrylate in accordance with this invention. Thus, any alkali metal alkyl or aryl, alkaline earth metal alkyl or aryl, or aluminum alkyl or metal alkyl halides or hydrides may be used. Of particular importance are the organometallic compounds of an alkaline earth or aluminum. Exemplary of the organometallic compounds that may be used are butyllithium, amylsodium, phenylsodium, dimethyl magnesium, diethyl magnesium, diethyl zinc, butyl magnesium chloride, ethyl magnesium chloride, phenyl magnesium bromide, trimethylaluminum, triethylaluminum, tripropylaluminum, triisobutylaluminum, trioctylaluminum, tridodecylaluminum, dimethylaluminum chloride, diethylaluminum bromide, diethylaluminum chloride, ethylaluminum dichloride, the equimolar mixture of the latter two known as aluminum sesquichloride, dipropylaluminum fluoride, diisobutylaluminum fluoride, diisobutylaluminum chloride, diethylaluminum hydride, ethylaluminum dihydride, diisobutylaluminum hydride, and complexes of such organoaluminum compounds, as for example, sodium aluminum tetraethyl, lithium aluminum triethylbutyl, lithium aluminum trioctylbutyl, sodium aluminum triethyl chloride, etc.

Any mode of introducing the two catalyst components into the polymerization system may be utilized. Usually the organometallic compound and the transition metal compound are added in the form of solutions or suspensions in inert organic diluents. Either one may be introduced into the system followed by the second or they may be introduced simultaneously, or added in increments or continuously throughout the polymerization. The amount of the two catalyst components may be varied over a wide range, but in general, the molar ratio of organometallic compound to transition metal compound will be within the range of from about 0.1:1 to about 20:1 and preferably within the range of about 0.3:1 to about 10:1.

In accordance with this invention, using a combination of transition metal compound and organometallic compound, it is frequently desirable to incorporate in the reaction mixture a complexing agent for the organometallic compound used for the polymerization. Just what may be the function of the complexing agent is not completely understood, but it is believed that it forms a complex with the organometallic compound to prevent any undesirable side reactions which might otherwise take place between the organometallic compound and the monomer or polymer. Any compound that will form a loose type of complex (possibly functioning as an electron donor) with the organometallic compound may be used, as for example, ethers, tertiary amines, esters, ketones, nitroaromatics, etc., provided it does not destroy an excessive amount of the organometallic compound present. Exemplary of the complexing agents that have been found to be particularly effective are ethers such as diethyl ether, tetrahydrofuran, etc., triethylamine and ethyl acetate. Any amount of the complexing agent may be used, but preferably an amount is used such that at least about one mole of it per mole of organometallic compound present in the polymerization system is used. It may be added with the organometallic compound or in some cases with the transition metal compound, or it may be added to the solution of monomer. In many cases it may be desirable to use the complexing agent, as for example, diethyl ether and tetrahydrofuran, as the major component of the inert organic diluent being used for the polymerization process.

The polymethyl methacrylate produced in accordance with this invention is crystalline and hence is useful for a wider range of applications than in the case of the prior art polymethyl methacrylates. It may be used for the preparation of films, fibers, and plastics which are tough, particularly when oriented. It is also useful in coatings, particularly coatings applied to metal. In the fabrication of such articles or use in coatings, it may be desirable to add stabilizers and other ingredients, as for example, pigments, etc.

The following examples will illustrate the process of preparing crystalline polymethyl methacrylate in accordance with this invention and some of the many modifications that can be made in this process.

EXAMPLE 1

A polymerization vessel from which the air had been removed and replaced with nitrogen was charged with 29.3 parts diethyl ether, 10 parts of methyl methacrylate, and 0.40 part of triisobutylaluminum in 1.3 parts of n-heptane. After equilibrating the vessel and contents at 30° C., a suspension of 0.16 part of vanadium trichloride which had been ball-milled for 6 hours at room temperature in 5 parts of n-heptane was added. The reaction mixture was agitated and held at 30° C. for 19 hours, after which the polymerization was stopped by adding 4 parts of anhydrous ethanol. The insoluble polymer which had separated was collected, washed twice with 100 parts of diethyl ether and dried. The polymer was then dissolved in boiling xylene, the hot solution filtered, and the polymer reprecipitated by adding a large excess of methanol. The polymer was again collected, washed with methanol, and then dried for 16 hours at room temperature in vacuum. The polymethyl methacrylate so obtained was shown to be crystalline by its X-ray diffraction powder pattern.

A film of this crystalline polymethyl methacrylate was solvent-cast on aluminum whereby there was obtained a strongly adhesive film.

EXAMPLE 2

The procedure of Example 1 was repeated except that instead of the ball-milled vanadium trichloride there was added the reaction product obtained by mixing 0.08 part of triethylaluminum with 0.2 part of vanadium tetrachloride in 2.7 parts of n-heptane and aging for 2 hours at room temperature. At the end of 19 hours at 30° C., the polymerization was stopped by adding 1.6 parts of butanol. The reaction mixture was then diluted with 150 parts of ether and the insoluble polymer which had separated was collected, washed twice with anhydrous butanol, and dried for 16 hours at room temperature in vacuum. The polymer so obtained had a crystalline-type X-ray diffraction powder pattern.

EXAMPLE 3

A polymerization vessel free from air was charged with 17.5 parts of tetrahydrofuran, 10 parts of methyl methacrylate, and 0.24 part of diethylaluminum chloride in 1 part n-heptane. After equilibrating the vessel and contents at 30° C., there was added 0.16 part of vanadium trichloride which had been ball-milled in 3 parts of n-heptane to a particle size of about 2 microns. After 19 hours at 30° C., the polymerization was stopped by adding 1.6 parts of n-butanol. To the polymerization mixture was then added 150 parts anhydrous ethanol. The insoluble polymer which had separated was then collected, washed twice with ethanol, and dried for 16 hours at room temperature in vacuum. This polymethyl methacrylate was suspended in a large excess of methyl isobutyl ketone, agitated for 1 day, separated, washed twice with methyl isobutyl ketone, and then was dissolved in boiling toluene, filtered to remove any inorganics, and reprecipitated by adding an excess of methanol. The polymer was again collected and dried for 16 hours at 80° C. in vacuum. It had a specific viscosity of 0.45 as determined on a solution in α-chloronaphthalene at 135° C.

EXAMPLE 4

The procedure of Example 3 was repeated except that 3.5 parts of tetrahydrofuran instead of 17.5 parts was used, and 0.23 part of triethylaluminum was used in place of the 0.24 part of diethylaluminum chloride. After 19 hours at 30° C., the polymerization was stopped as before and the mixture diluted with 150 parts of anyhdrous ethanol. The insoluble polymer that had separated was collected, washed twice with ethanol, and dried for 16 hours at room temperature in vacuum. The polymethyl methacrylate so obtained was purified by dissolving in toluene, filtering, and reprecipitating the polymer by adding a large excess of methanol. After collecting and drying for 16 hours at 80° C. in vacuum, the polymer was found to have a crystalline-type X-ray diffraction powder pattern and a specific viscosity of 0.25 as determined on a solution in α-chloronaphthalene at 135° C.

EXAMPLE 5

A polymerization vessel which had been freed from air was charged with 17.5 parts of tetrahydrofuran, 10 parts of methyl methcrylate, and a solution of 0.24 part of diethylaluminum chloride in 1 part n-heptane to which had been added 0.14 part of tetrahydrofuran. After equilibrating at 30° C., there was added the reaction product obtained by mixing 0.07 part of butyllithium with 0.19 part of vanadium tetrachloride in 2.7 parts of n-heptane. After 19 hours at 30° C., the polymerization was stopped by adding 1.6 parts n-butanol and the polymer was isolated and purified as described in Example 4. The polymethyl methacrylate so obtained had a specific viscosity of 0.30 as determined on a solution in α-chloronaphthalene at 135° C.

EXAMPLE 6

A polymerization vessel from which the air had been removed was charged with 35 parts n-heptane, 10 parts of methyl methacrylate, and the reaction product obtained by mixing 0.12 part of diethyl magnesium with 0.10 part of titanium tetrachloride in n-heptane and aging for 0.5 hour at room temperature. After 19 hours at 30° C., the insoluble polymer which had separated was collected and refluxed with 100 parts of a 10% solution of hydrogen chloride in methanol. The polymer so obtained, after drying, had a specific viscosity of 0.39 as determined on a solution in benzene at 135° C. The polymer was dissolved in toluene, reprecipitated by adding an excess of methanol, and after drying was extracted with methyl isobutyl ketone. The insoluble polymer which remained was then collected and dried for 16 hours at 60° C. in vacuum. It had a crystalline-type X-ray diffraction powder pattern and the carbon and hydrogen analyses were in agreement with the theoretical values.

EXAMPLE 7

A polymerization vessel from which the air had been removed was charged with 18 parts n-heptane, 10 parts of methyl methacrylate, and 0.40 part of triisobutylaluminum in 1.3 parts of n-heptane to which 0.14 part of tetrahydrofuran had been added. After equilibrating at 30° C., there was added 0.20 part of molybdenum trichloride which had been ball-milled in n-heptane. After 22 hours at 30° C., the insoluble polymer which had separated was collected, washed with heptane, and dried in vacuum for 2 hours at 80° C. This polymer was then dissolved in 40 parts of methylene chloride and after filtering the solution, the polymer was precipitated by adding 300 parts of anhydrous ethanol. The polymer was dried at 75° C. in vacuum for 2 hours. It had a specific viscosity of 0.39 as determined on a solution in α-chloronaphthalene at 135° C. The polymer was then extracted for 22 hours with a 5:1 mixture of methyl isobutyl ketone and n-heptane. The insoluble polymer that remained was separated and dried at 40° C. in vacuum for 64 hours. It had a crystalline-type X-ray diffraction powder pattern.

EXAMPLE 8

The procedure of Example 7 was repeated except that in place of molybdenum trichloride there was added to the polymerization mixture 0.16 part of ferric chloride which had ben ball-milled in n-heptane. The insoluble polymer so obtained was isolated and then extracted with methylene chloride. It was then dissolved in boiling xylene, the solution filtered and the polymer reprecipitated by adding methanol. On drying in vacuum for 16 hours, there was obtained a white solid which had a crystalline-type X-ray diffraction powder pattern.

EXAMPLE 9

A polymerization vessel free from air was charged with 19.4 parts of methylene chloride, 7.2 parts of n-heptane, 10 parts of methyl methacrylate, 0.40 part of triisobutylaluminum, and after equilibrating at 30° C., 0.16 part of ball-milled chromium trichloride was added. After 22 hours at 30° C., the polymerization was stopped by adding 4 parts of anhydrous ethanol. The entire polymerization mixture was filtered to remove inorganics and the polymer was precipitated by pouring the filtrate into a large excess of anhydrous ethanol. The polymer was collected and dried at 75° C. for 2 hours in vacuum. It had a specific viscosity of 0.95 as determined on a solution in α-chloronaphthalene at 135° C. This polymer was then suspended in a 5:1 mixture of methyl isobutyl ketone and n-heptane and agitated for 64 hours at 35° C. The insoluble polymer which remained was separated and dried in vacuum at 40° C. for 24 hours. It amounted to 50% of the total polymer and was shown to have a crystalline-type X-ray diffraction powder pattern.

EXAMPLE 10

A polymerization vessel freed from air was charged with 26.7 parts of methylene chloride, 10 parts of methyl methacrylate, and 0.40 part of triisobutylaluminum in n-heptane and after equilibrating at 30° C., 0.12 part of ball-milled chromous chloride in n-heptane was added (total n-heptane present in the system was 3.5 parts). After 22 hours at 30° C. the polymerization was stopped by adding 4 parts of anhydrous ethanol and the polymer was isolated by precipitation in anhydrous ethanol as in Example 9. It had a specific viscosity of 1.24 as determined on a solution in α-chloronaphthalene at 135° C. After treatment with the mixture of methyl isobutyl ketone and n-heptane as in Example 9, the insoluble polymethyl methacrylate so isolated amounted to 55% of the total polymer, had a specific viscosity of 1.53 as determined on a solution in α-chloronaphthalene at 135° C., and was shown to have a crystalline-type X-ray diffraction powder pattern.

EXAMPLE 11

Example 10 was repeated except that 0.10 part of chromium trioxide was substituted for the 0.12 part of chromous chloride used in that example. The polymer insoluble in the methyl isobutyl ketone—n-heptane solvent mixture was shown to have a crystalline-type X-ray diffraction powder pattern.

EXAMPLE 12

A polymerization vessel freed from air was charged with 15 parts of toluene, 10 parts of methyl methacrylate, and a preformed catalyst prepared by mixing 0.08 part of diethyl magnesium with 0.19 part of potassium dichromate in 5.3 parts n-heptane and aging for 1 hour at room temperature. After 22 hours at 30° C., the polymerization was stopped and after filtering the reaction mixture, the polymer was precipitated by pouring into a large excess of anhydrous ethanol. The polymer so obtained had a specific viscosity of 1.27 as determined on a solution in α-chloronaphthalene at 135° C. and on treatment as described in Example 9 with a mixture of methyl isobutyl ketone and n-heptane was found to be 100% insoluble. It had a crystalline-type X-ray diffraction powder pattern.

EXAMPLE 13

A polymerization vessel was charged with n-heptane, 10 parts of methyl methacrylate, and a preformed catalyst prepared by mixing 0.10 part of ball-milled molybdenum trichloride with 0.12 part of diethyl magnesium in n-heptane and aging for 0.5 hour at room temperature (total amount of diluent in the reaction mixture was 17.5 parts). After 22 hours at 30° C., the insoluble polymer was separated by filtration, slurried with 100 parts of anhydrous ethanol, filtered and washed with anhydrous ethanol. It was then purified by dissolving it in methylene chloride, removing the inorganics by filtration, and reprecipitating the polymer by dilution with an excess of anhydrous ethanol. The specific viscosity of this polymer was 2.66 as determined on a solution in α-chloronaphthalene at 135° C. After agitating the polymer with a 5:1 mixture of methyl isobutyl ketone and n-heptane for 64 hours at 35° C., the insoluble polymer which remained was separated and dried. It amounted to 72% of the total polymer, had a specific viscosity of 3.2 as determined on a solution in α-chloronaphthalene at 135° C. and was shown to have a crystalline-type X-ray diffraction powder pattern.

EXAMPLE 14

Example 13 was repeated except that 0.063 part of ball-milled manganese dichloride was used in place of 0.10 part of molybdenum trichloride used in that example. The insoluble polymer obtained after treatment with the methyl isobutyl ketone—n-heptane mixture amounted to 88% of the total polymer and had a specific viscosity of 1.26 as determined on a solution in α-chloronaphthalene at 135° C. It was shown to have a crystalline-type X-ray diffraction powder pattern.

What I claim and desire to protect by Letters Patent is:

1. The process of preparing polymethyl methacrylate which comprises contacting methyl methacrylate with the catalyst consisting of that formed by mixing a compound selected from the group consisting of the oxides, inorganic salts, and organic salts of a metal selected from the group consisting of the metals of Groups IV-B, V-B, VI-B, VII-B and VIII of the Periodic Table with an alkyl compound of a metal selected from the group consisting of alkali metals, alkaline earth metals, zinc, and aluminum.

2. The process of claim 1 wherein the polymerization is carried out in the presence of a complexing agent for the metal alkyl compound, said complexing agent being selected from the group consisting of diethyl ether and tetrahydrofuran.

3. The process of preparing polymethyl methacrylate which comprises contacting methyl methacrylate with a two-component catalyst composition consisting of (1) the reaction product of a compound selected from the group consisting of the oxides, inorganic salts, and organic salts of a metal selected from the group consisting of the metals of Groups IV-B, V-B, VI-B, VII-B and VIII of the Periodic Table with an alkyl compound of a metal selected from the group consisting of alkali metals, alkaline earth metals, zinc, and aluminum, and (2) an alkyl compound of a metal selected from the group consisting of alkali metals, alkaline earth metals, zinc, and aluminum.

4. The process of claim 1 wherein the catalyst is that formed by mixing a titanium salt with an alkylmagnesium compound.

5. The process of claim 1 wherein the catalyst is that formed by mixing a vanadium salt with an alkylaluminum compound.

6. The process of claim 1 wherein the catalyst is that formed by mixing a molybdenum salt with an alkylaluminum compound.

7. The process of claim 1 wherein the catalyst is that formed by mixing a chromium salt with an alkylaluminum compound.

8. The process of claim 3 wherein the titanium salt is titanium tetrachloride and the alkylmagnesium compound is diethylmagnesium.

9. The process of claim 4 wherein the vanadium salt is vanadium trichloride and the alkylaluminum compound is a trialkylaluminum.

10. The process of claim 5 wherein the molybdenum salt is molybdenum trichloride and the alkylaluminum compound is a trialkylaluminum.

11. The process of claim 6 wherein the chromium salt is chromium chloride and the alkylaluminum compound is a trialkylaluminum.

12. A crystalline homopolymer of methyl methacrylate produced by the process of claim 1.

No references cited.

JOSEPH L. SCHOFER, *Primary Examiner.*

H. WONG, JR., *Assistant Examiner.*